United States Patent [19]

Kawano et al.

[11] Patent Number: 4,972,346
[45] Date of Patent: Nov. 20, 1990

[54] HIGH-FREQUENCY SIGNAL BOOSTER

[75] Inventors: Minori Kawano; Koji Mihashi, both of Hyogo, Japan

[73] Assignee: Mitsubishi Denki Kabushiki Kaisha, Tokyo, Japan

[21] Appl. No.: 172,057

[22] Filed: Mar. 23, 1988

[30] Foreign Application Priority Data

| Mar. 24, 1987 | [JP] | Japan | 62-69483 |
| Mar. 31, 1987 | [JP] | Japan | 62-79908 |
| Mar. 31, 1987 | [JP] | Japan | 62-79909 |
| Apr. 3, 1987 | [JP] | Japan | 62-83179 |

[51] Int. Cl.$^5$ .............................................. H04B 7/14
[52] U.S. Cl. .......................................... 455/9; 455/21; 455/22; 455/33
[58] Field of Search ........................ 455/17, 15, 16, 14, 455/19, 22, 23, 33, 9, 54, 56, 20, 21, 67, 226; 370/24, 75, 30; 379/59

[56] References Cited

U.S. PATENT DOCUMENTS

| 4,754,495 | 6/1988 | Kawano et al. | 455/33 |
| 4,764,979 | 8/1988 | Noguchi et al. | 455/15 |
| 4,849,963 | 7/1989 | Kawano et al. | 455/15 |

OTHER PUBLICATIONS

Cellular Business Jul. 1986, pp. 40 and 42, Cell Enhancer: Beyond the Outer Limits by Amy Rosenbloom and Jim Ferguson.
Cellular Business Jan. 1987, p. 38.
The Cell Enhancer by Edwin W. Quinn (Bell Atlantic Mobile System), 1986 IEEE pp, 77~83.
FCC Requirements for Type Accepting Radio Boosters and Licensing Distributed Antenna Systems, by Franklin Coperich (FCC Authorisation and Standards Division) and Charles F. Turner (FCC Rules Division) 1982 IEEE pp. 247~254.

Primary Examiner—Reinhard J. Eisenzopf
Assistant Examiner—Curtis Kuntz
Attorney, Agent, or Firm—Wolf, Greenfield & Sacks

[57] ABSTRACT

A high-frequency signal booster which has at least one channel unit including a down-converter for converting input signals into intermediate-frequency signals and an up-converter for converting time into output signals. The respective up- and down-converters are separately equipped with station-originating signal oscillators. Further, the station-originating signal oscillator provided for the up-converter has a function of effecting the modulation with out-of-voice-band signals.

19 Claims, 15 Drawing Sheets

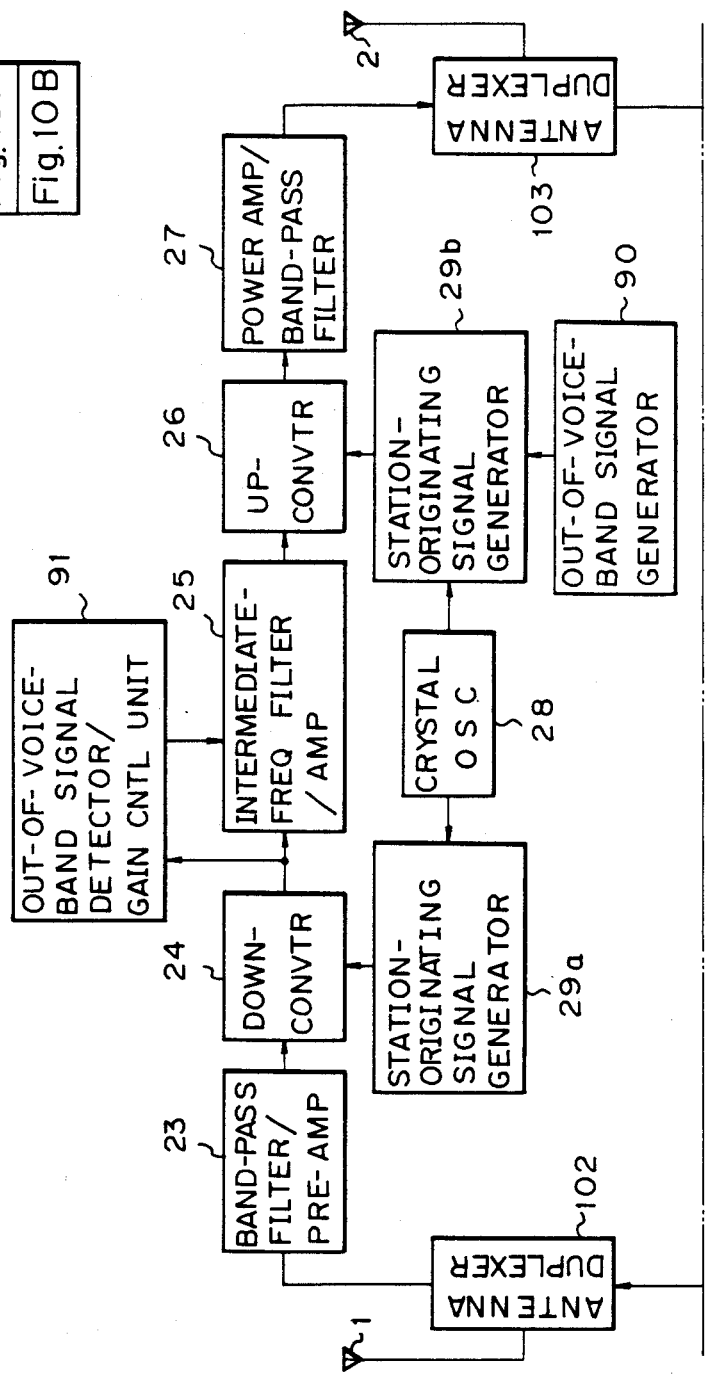

HIGH-FREQUENCY SIGNAL BOOSTER

BACKGROUND OF THE INVENTION

1. Field of the Invention

The present invention relates generally to a system for amplifying and reradiating received radio waves and more particularly to a "high-frequency signal booster" or "booster amplifier" for amplifying and reradiating high-frequency waves to a dead area of a small-cell mobile radio communication system (for example, a cell enhancer for amplifying and reradiating radio waves to a cell-drop area of a cellular mobile telephone system) and for expanding a "service area" of a base station to the outside of an existing "service area". The term "service area" is used in this application to describe the area which is effectively served by a base station, that is, the coverage of the base station. Further, the term "service territory" is used to describe the area or territory in which a base station has the right to supply communication service to a mobile unit being moving therein and charge the owner of the mobile unit for the service.

2. Background Discussion and Objects of the Invention

Directing now attention to FIG. 1, there is shown a conventional high-frequency (HF) signal booster. In this figure, reference numerals 1, 2, 3 and 4 denote a "base station antenna" for use in communicating with a base station, a "mobile station antenna" for use in communicating with a mobile station, an antenna duplexer constituting a "base station antenna" system, and another antenna duplexer constituting a "mobile station antenna" system, respectively. Further, reference numerals 5 and 6 denote linear power amplifiers.

Next, operation of this conventional HF signal booster will be described hereinbelow.

First, radio waves are received by the base station antenna 1. Then, the incoming signal is led through the antenna duplexer 3 to the power amplifier 5. The thus amplified signal is transmitted to the mobile station antenna 2 through the antenna duplexer 4 and further radio waves are radiated therefrom into space.

On the other hand, in case of radio waves received by the mobile station antenna 2, the incoming signal is led through the antenna duplexer 4 to the power amplifier 6. The amplified signal is further transmitted to the base station antenna 1 through the antenna duplexer 3 and radio waves are radiated therefrom into space.

The above-described conventional system is attended with the following problems. A frequency of an incoming or input signal is equal to that of an output signal. Error rate of digital signals increases and additionally interference noises occur due to mutual interference between the radio wave which is radiated from the base station and then directly received by the booster and that which is amplified by the booster and then reradiated.

Accordingly, it is an object of the present invention which is made in order to obviate the above-described problems to provide an HF signal booster being capable of varying the frequencies of the input and output signals and effecting modulation of the output signal by employing a signal of which frequency is in the voice band (hereunder referred to simply as an "out-of-voice-band signal").

To accomplish this object, in accordance with a first aspect of the present invention, there is provided an HF signal booster including a power amplifier which can be used in common in both operations of amplifying input signals sent from a base station and of amplifying signals sent from a mobile station (hereunder referred to simply as "up and downstream operations").

Another example of the prior art system of this type is described in Paper Collection Vol. 37 of the Study Publication Association of the Electric Communication Institute (Nippon Telegraph & Telephone Public Corporation).

Referring to FIG. 2, there is shown the conventional booster of this type. As in FIG. 1, reference numerals 1 and 2 indicate a receiving antenna and a transmitting antenna, respectively. Further, reference numeral 23 denotes a band-pass filter/pre-amplifier; 24 a down-converter; 25 an intermediate-frequency filter/amplifier; 26 an up-converter; 27 a power amplifier/band-pass filter; 28 a highly stable crystal oscillator; and 29 a station-originating signal generator.

Further, operation of this conventional system will be explained hereinbelow.

High-frequency signals received by the receiving antenna 1 are selectively amplified by the band-pass filter/pre-amplifier 23 and applied to the down-converter 24, in which the received signals are combined with signals supplied from the station-originating signal generator 29 and are thereby converted into intermediate-frequency signals. The thus converted signals are further selectively amplified by the intermediate-frequency filter/amplifier 25 and applied to the up-converter 26. The intermediate-frequency signals are combined with the signals fed from the station-originating signal generator 29 in the up-converter 26, whereby they are converted into high-frequency signals. The high-frequency signals are selectively amplified by the power amplifier/band-pass filter 27 and are then transmitted from the transmitting antenna 2. The station-originating signal generator 29 is controlled by the highly stable crystal oscillator 28. The received signals and the transmitted signals can be held at the same frequency by supplying signals of the same frequency to the down-converter 24 and the up-converter 26.

The conventional system is constructed in the above-described manner. Consequently, the signals given forth from the transmitting antenna are received by the receiving antenna once again and thus what is called a 'singing' phenomenon, that is, self-oscillation takes place. Prevention of the occurrence of this phenomenon requires such an arrangement that a coupling loss or attenuation occurring between the transmitting and receiving antennas is set to a value sufficiently greater than a gain of the booster. An additional defect of the prior art system is that the occurrence of the 'singing' phenomenon cannot be automatically detected from variations in condition of the system. The present invention is accomplished to obviate these problems of the conventional system.

Accordingly, another object of the present invention is to prevent the 'singing' phenomenon by automatically controlling the gain of the booster when the coupling loss occurring between the transmitting and receiving antennas decreases for some reason and to further permit giving an alarm through a detection circuit.

FIG. 3 is a block diagram illustrating a still another conventional system. In this figure, reference numeral 1 denotes a "base station antenna"; 2 a "mobile station antenna"; 3 and 4 antenna duplexers; 39 and 321 one-totwo branching devices; 310a and 322a elements each having "narrow-band selectivity" (that is, passing a band of frequencies which has relatively small bandwidth); 310b and 322b elements each having "wideband selectivity" (that is, passing a band of frequencies which has relatively large bandwidth); 311 and 323 synthesizers (or combiners); and 312 and 324 wideband power amplifiers.

Next, operation of this conventional system will be described hereinbelow. Radio waves from the base station are received by the base station antenna 1 and the input signals are led through the antenna duplexer 3 to the branching device 321 where they are branched and further led to the elements 322a and 322b. The element 322a having the narrow-band selectivity is allocated for a control channel. On the other hand, the element 322b having the wide-band selectivity is allocated for a message channel. The radio waves have been selectively amplified by these elements 322a and 322b. Thereafter, the amplified waves are synthesized (or combined) by a dual synthesizer 323 and further amplified by a common amplifier 324. Furthermore, the synthesized and amplified waves are reradiated from the mobile station antenna 2 through the antenna duplexer 4. Thus, the radio waves received by the base station antenna 1 are reradiated at the same frequency from the mobile station antenna 2.

On the other hand, the radio waves transmitted from the mobile station are received by the mobile station antenna 2 and branched off through the antenna duplexer 4. The received radio waves are further transmitted through a route which is similar to the above-described one, (that is, by way of the branching device 329, the element 310a having the narrow-band selectivity, the element 310b having the wide-band selectivity, the dual synthesizer 311, the common amplifier 312 and the antenna duplexer 3) to the base station antenna 1 from which they are reradiated.

Since this conventional HF signal booster has the foregoing construction, it follows that a plurality of radio waves are applied to the common amplifiers 312 and 324. This results in defects of this conventional system that an output power having a large magnitude cannot be obtained for retraining unnecessary waves produced by inter-modulation and that in the control channel, there increases a bit error rate of digital signals due to mutual interference between the radio wave directly coming from the base station (that is, the direct signals) and the wave reradiated from an HF signal booster. The present invention is accomplished to eliminate these problems of the conventional system.

Accordingly, it is a still further object of the present invention to provide an HF signal booster being capable of obtaining the large output power even when restraining the inter-modulation.

Yet another object of the invention is to prevent the mutual interference between the reradiated waves and the directly coming waves.

Turning now attention to FIG. 4, there is illustrated an example wherein two service areas for an existing cellular mobile telephone system and a booster system are adjacent to each other. Reference numerals 43 and 44 designate base stations. Further, reference numerals 41 denotes a transmitting antenna of the base station 43. Moreover, reference numerals 42 and 45 denote a mobile station antenna and a base station antenna of the booster station 44, respectively. Reference numeral 46 indicates a curve showing an intensity of the radio wave emitted from the transmitting antenna 41 of the base station 43; and 47 a curve showing an intensity of the radio wave emitted from the base station antenna 42 of the booster station 44. Further, reference numeral 48 indicates a direction of transmission of the RF signal, which is transmitted from the antenna 41 of the base station 43 and received by the antenna 45 of the booster station 44. Moreover, reference numeral 49 indicates a borderline drawn through a spot at which the intensities of radio waves transmitted from the adjacent transmitting antennas 41 and 42 are substantially equal with each other.

Next, operation of this conventional system will be described hereinbelow. The mobile station is generally adapted to scan control channels or set-up channels constantly assigned when the mobile station is located in an intermediate zone in which the contiguous service areas are partly overlapped with each other. The mobile station is also adapted to choose the strongest channel to be used for transmitting and receiving messages.

For instance, when the mobile station is positioned in a region lying between the base station 43 and the borderline 49, the mobile station accesses the station 43. Contrarily, when the mobile station is positioned in another region lying between the booster station 44 and the borderline 49, the mobile station accesses this station booster 44. If the mobile station is positioned around the borderline 49, interference between the direct signals from the transmitting antenna 41 of the base station 43 and the reradiated signals from the mobile station antenna 42 of the booster station 44 is observed due to the time lag between the reception of the direct signals and the reradiation of the signals. Thereby, error detection of the digital data transmission can be effected. The present invention is accomplished to eliminate these problems of the conventional system.

SUMMARY OF THE INVENTION

In accordance with a first aspect of the present invention, there is provided an HF signal booster which has at least one channel unit including a down-converter for converting input signals into intermediate-frequency signals and an up-converter for converting them into output signals. The respective up- and down-converters are separately equipped with station-originating signal oscillators. Further, the station-originating signal oscillator provided for the up-converter has a function of effecting the frequency modulation with out-of-voice-band signals.

According to the present invention, the frequencies of the input and output signals can or the direct and reradiated signals be made different from each other by an amount corresponding to a plurality of channels. Even when the value of the frequency of the input signals is set to be the same as that of the frequency of the output signals, at least the frequency of the output signal can be frequency modulated by the out-of-voice-band signal. Hence, it is possible to eliminate or diffuse the mutual interference between the input and output signals or between the direct and reradiated signals.

As stated above, the present invention has the following advantages. The station-originating signal oscillators are provided appropriately for the up- and down-converters. The station-originating signal oscillator for the up-converter is arranged such that the frequency modulation is effected with the out-of-voice-band signals, and hence it is possible to moderate or eliminate the mutual interference between the input and output signals, or between the direct and reradiated signals whereby the HF signal booster of the present invention can reradiate radio wave of high quality.

In accordance with a second aspect of the present invention, an HF signal booster is arranged in such a way that: frequency-modulation is effected on output signals from a transmitting antenna by using out-of-voice-band signals; a rate of coupling loss or attenuation occurring between the transmitting and receiving antennas is measured by detecting the out-of-voice-band signals from input signals transmitted from the receiving antenna; if the coupling loss exceeds a given limit, a gain of the booster is constantly controlled to be kept within a range of the coupling loss.

According to the present invention, the output signals are frequency-modulation by effecting the modulation directly on the station-originating signal generator provided to the up-converter by employing the out-of-voice-band signals, while the detection of the out-of-voice-band signals from the input signals is performed by amplifying and detecting the output signals of the down-converter.

As described above, the present invention further has the following effect. That is, the output signals are frequency-modulated by use of the out-of-voice-band signals, and thereby, the output signals can be distinguished from the input signals. Hence, it is possible to prevent occurrence of what is called a 'singing' phenomenon, that is, to prevent self-oscillation of the circuit which is caused by signals radiated from the transmitting antenna and received by the receiving antenna. Further, it is possible to disperse the mutual interference attributed to delay of the input and output waves.

In accordance with a third aspect of the present invention, an HF signal booster is provided with a high-gain directional antenna for the purpose of saving the output power working in an "upstream direction" (that is, in a direction toward a base station) and is further provided with an element having the narrow-band selectivity for every channel and a narrow-band power amplifier (usually, class C amplifier) connected in series thereto in a "downstream direction" (that is, in a direction toward a mobile station). Particularly, in the element for the control channel, a down-converter and an up-converter are respectively provided with station-originating signal oscillators so that the frequencies of the input and output signals are respectively shifted by amounts corresponding to a plurality of channels.

The element having the narrow-band selectivity and the narrow-band power amplifier of the present invention cooperate to restrain the inter-modulation caused by radio interference of two or more waves by selectively amplifying the radio waves for every channel. In addition, it is possible to prevent an increase in bit error rate of the digital signals which is attributed to the mutual interference between the direct waves and the reradiated waves by shifting the frequency each of the input and output signals in the control channel.

As discussed above, the present invention additionally provides the following effects. Namely, the HF signal booster of the present invention can increase reradiated power, and hence it is feasible to provide the booster in an area which is remote from the base station and to remarkably expand the service area of the base station. Furthermore, the services of the cellular mobile telephone system and so on become available by providing the system with more inexpensive equipments than provided in the ordinary base station.

BRIEF DESCRIPTION OF THE DRAWINGS

Other objects and advantages of the present invention will be understood by those ordinary skilled in the art after referring to the detailed description of preferred embodiments contained herein and to the drawings, wherein:

FIGS. 10, 10(a), 10(b) and 11 are block diagrams showing in combination a further embodiment of the present invention;

It should be noted that the same symbols indicate the same or similar components in the figures.

DESCRIPTION OF THE PREFERRED EMBODIMENTS

Figure 5:
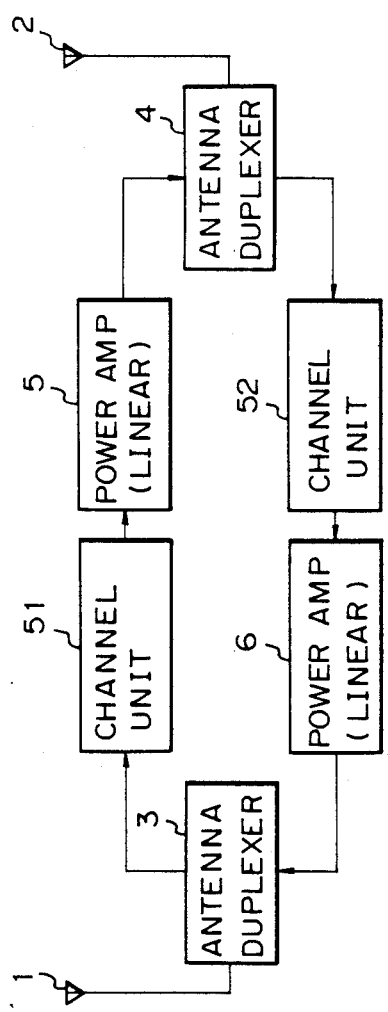
FIG. 5 is a block diagram showing an HF signal booster embodying the present invention.
Figure 6:
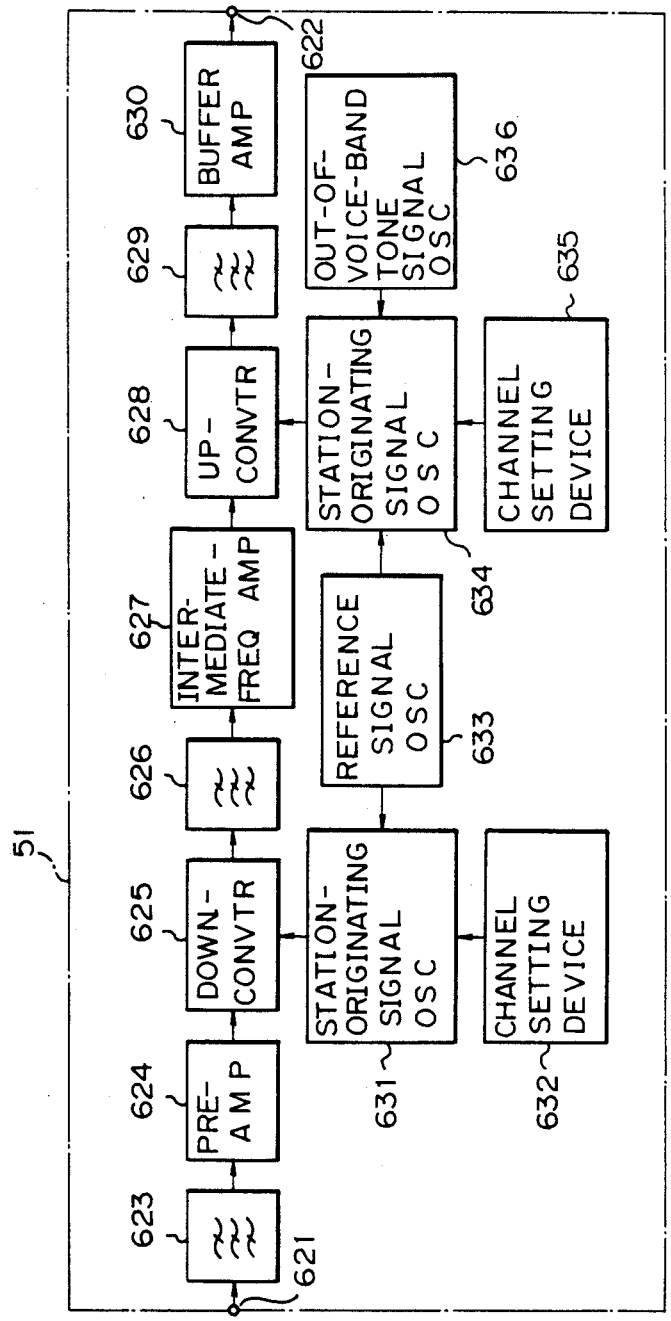
FIG. 6 is a block diagram showing one embodiment of a channel unit according to the present invention.

Referring now to FIG. 5, an embodiment of the present invention will be detailedly described hereinbelow. In this figure, the components designated by reference numerals 1 through 6 have the same functions as those of the components of the prior art system previously described herein. Reference numeral 51 stands for a channel unit connected in series to the power amplifier 5 disposed in the downstream direction; and reference numeral 52 a channel unit connected in series to the power amplifier 6 disposed in the upstream direction. Each individual channel unit performs a function of selectively amplifying the inputted signal with respect to all or part of a frequency band allocated to the system. As shown in FIG. 6, the channel units 51 and 52 respectively have an input terminal 621 and an output terminal 622. High-frequency signals applied from the input terminal 621 are selected by a band-pass filter 623 and amplified by a pre-amplifier 624. The high-frequency signals are further converted into intermediate-frequency signals by means of a down-converter 625. The intermediate-frequency signals are selected by a band-pass filter 626 transmitting a band of frequencies whose width is relatively small and are then amplified by an intermediate-frequency amplifier 627. Furthermore, the thus amplified signals are changed back to high-frequency signals by the up-converter 628 and amplified by a band-pass filter 629 and a buffer amplifier 630. The power amplifier 5 or 6 is connected to the output terminal 622.

Station-originating signals set by a channel setting device 632 and oscillated by a station-originating signal oscillator 631 are applied to the down-converter 625, while station-originating signals set by a channel setting device 635 and oscillated by a station-originating signal oscillator 634 are impressed on the up-converter 628. There is provided a reference signal oscillator 633 which generates the reference signals for the station-originating signal oscillators 631 and 634. An out-of-voice-band tone signal oscillator 636 is connected to the station-originating signal oscillator 634.

The respective station-originating signal oscillators for the up-converters 628 and down-converters 625 are capable of separately setting the channel; and the frequencies can be controlled by the same reference signal oscillator 633. It is therefore feasible to make the frequency of the input signal completely accord with that of the output signals and to accurately shift the frequency by a plurality of channels. If the channel unit is prepared for the control channel of the mobile telephone system, the frequency can be shifted by a plurality of channels, and the mutual interference between the input signals and the output signals can also be eliminated. Where the frequencies of the input and output signals cannot be shifted respectively by amounts corresponding to a plurality of channels as in the case of the voice channel, the interference noises may be dispersed by modulating or shifting the frequencies of the output signals in accordance with the out-of-voice-band tone signals.

Figure 7:
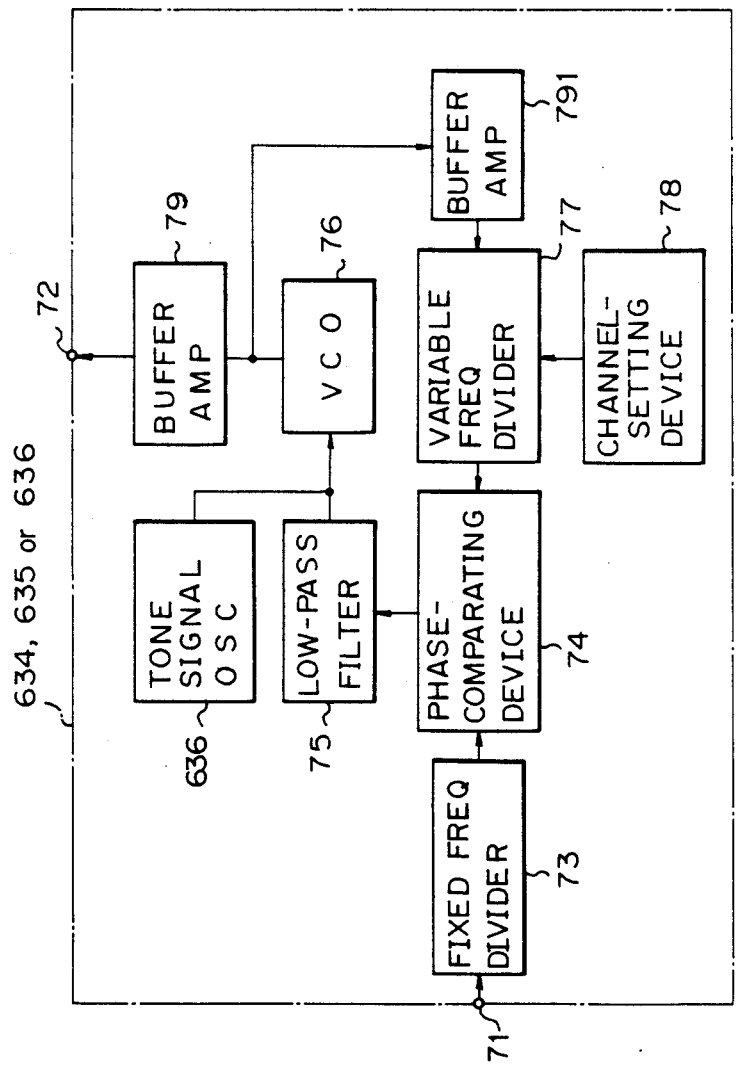
FIG. 7 is a block diagram illustrating one example of a station-originating signal oscillator according to the present invention and peripheral circuit thereof.

FIG. 7 illustrates one embodiment of the station-originating signal oscillator 634 for the up-converter and peripheral circuits 635 and 636 thereof. The reference signals transmitted from the input terminal 71 are divided by a fixed frequency divider 73 and are applied to a phase-comparing device (hereunder referred to simply as a phase comparator) 74. The station-originating signals oscillated by a voltage control oscillator (hereunder abbreviated as VCO) 76 are amplified by a buffer amplifier 79. The amplified station-originating signals, which passes through the output terminal 72, are connected to the up-converter 628. A part of signals of the VCO 76, which are transmitted through a buffer amplifier 791, are divided by a variable frequency divider 77 and applied to the phase comparator 74. A divisor employed in the frequency divisions to be effected in the variable divider 77 is set by the channel-setting device 78. Outputs of the phase comparator 74 pass through a DC amplifier and low-pass filter 75, and are applied to the control terminal of the VCO 76, thereby controlling the oscillation frequency. The tone signals from the oscillator 636 are applied to the VCO 76 in parallel with the signals of the phase comparator 74 so that a sufficient modulation factor can be obtained even by the tone signals having low frequencies.

Figure 8:
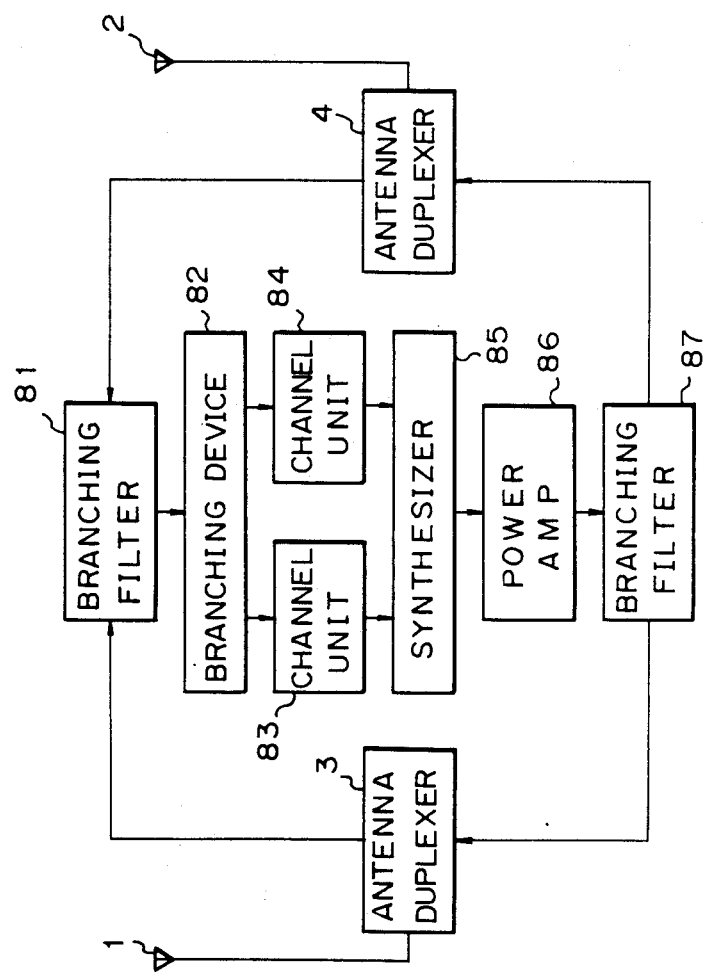
FIG. 8 is a block diagram of another HF signal booster embodying the present invention.

Turning now to FIG. 8, there is shown another HF signal booster embodying the present invention. The components indicated by numerals 1 through 4 perform the same functions as those of the corresponding components of the prior art system above-described, respectively. The signals sent from the base station are branched firstly by the antenna duplexer 3. Further, the signals are sent to a one-to-two branching device 82 through a branching filter 81 and once again branched therein. The thus branched signals are connected to the channel units 83 and 84. On the other hand, the signals from the mobile station are also transmitted through the antenna duplexer 4 and the filter 81 to the device 82. These signals are connected to the channel units 83 and 84 after passing through the device 82. One of the units 83 and 84 serves to selectively amplify all or part of the signals transmitted from the base station, and the other channel unit selectively amplifies all or part of the signals sent from the mobile station. The outputs from the units 83 and 84 are synthesized (or combined) by a synthesizer 85 and then amplified by a common power amplifier (linear amplifier) 86. The amplified signals are branched by the branching filter 87. The signals sent from the base station are transmitted by way of the antenna duplexer 4 to the mobile station antenna 2 from which the signals are to be radiated into the space. The signals from the mobile station are sent by way of the antenna duplexer 3 to the base station antenna 1 from which the signals are to be radiated into the space. The channel units 83 and 84 can perform the functions shown in FIGS. 6 and 7, and the power amplifier can be used for both the upstream and downstream operations. This realizes economical construction of the cell enhancer.

This embodiment has been described as provided with two channel units, one of which is for use in the upstream operation and the other of which is for use in the downstream operation. However, it is obvious to those skilled in the art that the channel units may be a couple of units, one of which has the narrow-band selectivity to be employed as a control channel and the other of which has the wideband selectivity to be employed as a voice channel. Moreover, in place of such channel units, the embodiment may be provided with a plurality of narrow-band channel units.

Furthermore, in the above-described embodiment, the channel units are provided separately from other portions thereof. The power amplifier, however, can have the same function as the channel units does, thereby saving the provision of the channel units to the booster.

Next, referring to FIG. 9, another embodiment of the present invention will be described hereinafter. In this figure, reference characters 29a and 29b denote station-originating signal generators which are provided for a down-converter 24 and an up-converter 26, respectively. These generators 29a and 29b have been driven by a highly stable crystal oscillator 28. Reference numeral 90 designates an out-of-voice-band signal generator, the signals of which are applied to the station-originating signal generator 29b associated with the up-converter 26. Further, reference numeral 91 denotes an out-of-voice-band signal detector/gain control unit for amplifying the outputs of the down-converter 24, detecting out-of-voice-band signals and controlling a gain of an intermediate-frequency amplifier 25.

Figure 9:
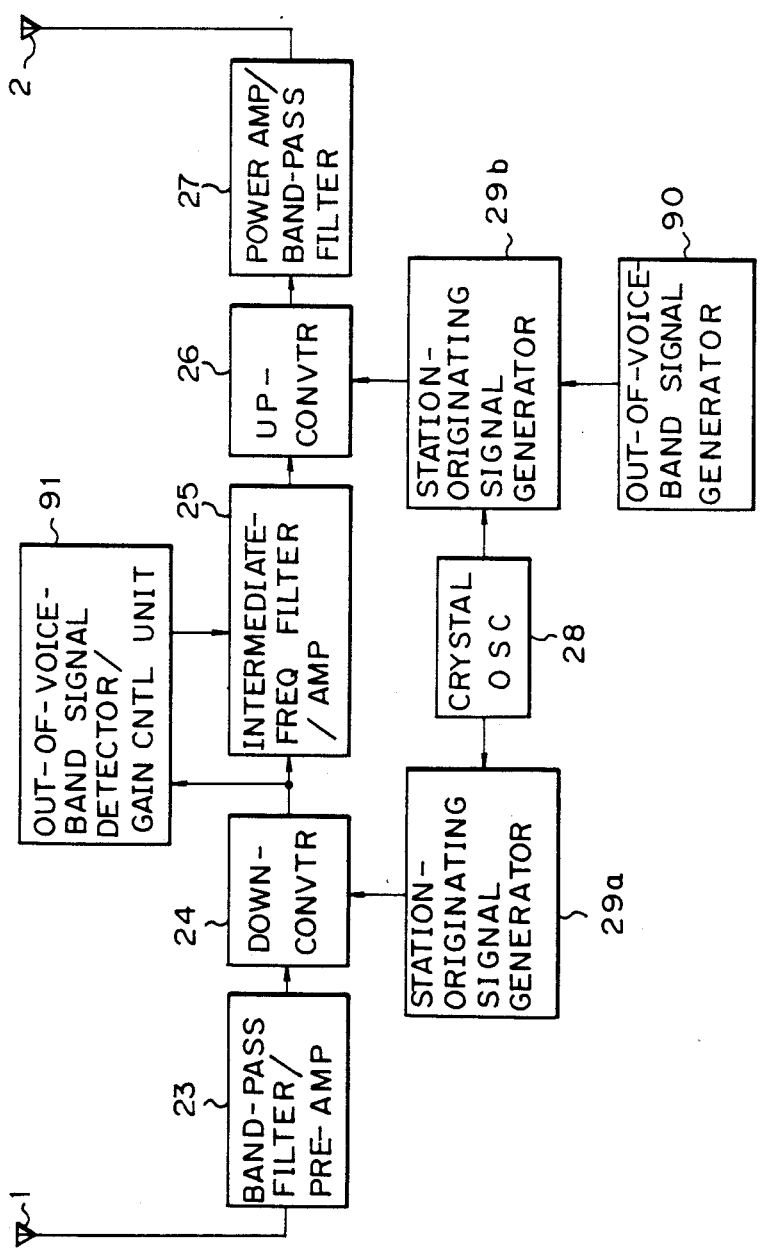
FIG. 9 is a block diagram of still another high-frequency amplifier system embodying the present invention.

In the embodiment shown in FIG. 9, frequency modulation or amplitude modulation or single-sidebnad (SSB) modulation is effected on the output signals with signals transmitted from the out-of-voice-band signal generator 90 with a view to distinguishing the output signals from the input signals. For this reason, the signals from the signal generator 90 are impressed on the station-originating signal generator 29b for the up-converter 26 and are frequency-modulated or amplitude-frequency-modulated. Subsequently, such signals are combined with the signals of the intermediate-frequency amplifier 25, thereby obtaining the output signals which have been modulated by employing the out-of-voice-band signals.

If the modulated output signals are coupled to the receiving antenna 1 after having been radiated from the transmitting antenna 2, these output signals are added to or combined with the "proper input signals" which are sent from the base or mobile stations. The resultant signals are converted into intermediate-frequency signals by use of the down-converter 24. When the out-of-voice-band signal is detected by the detector 91, the system concludes that the output signals have been combined with the "proper input signals". Then the gain of the intermediate-frequency amplifier 25 is reduced till the strength of the detected signal decreases to a predetermined level, thus preventing occurrence of what is called a 'singing' phenomenon.

Namely, the control is allowable till the following equation (1) or (2) is satisfied:

$$I+G-L=I-9 \ (dBm) \quad (1) \ \text{or}$$

$$G=L-9 \ (dB) \quad (2)$$

where G, I and L are the total gain of the booster including an antenna gain (in dB), the ratio of the desired wave receiving input to the receiving antenna (in dBm) and the coupling loss occurring between the antennas (in dB), respectively. This can be understood from the fact that unnecessary waves are restrained when a ratio of strength of a desired wave to that of unnecessary wave is 9 dB.

Figure 10B:
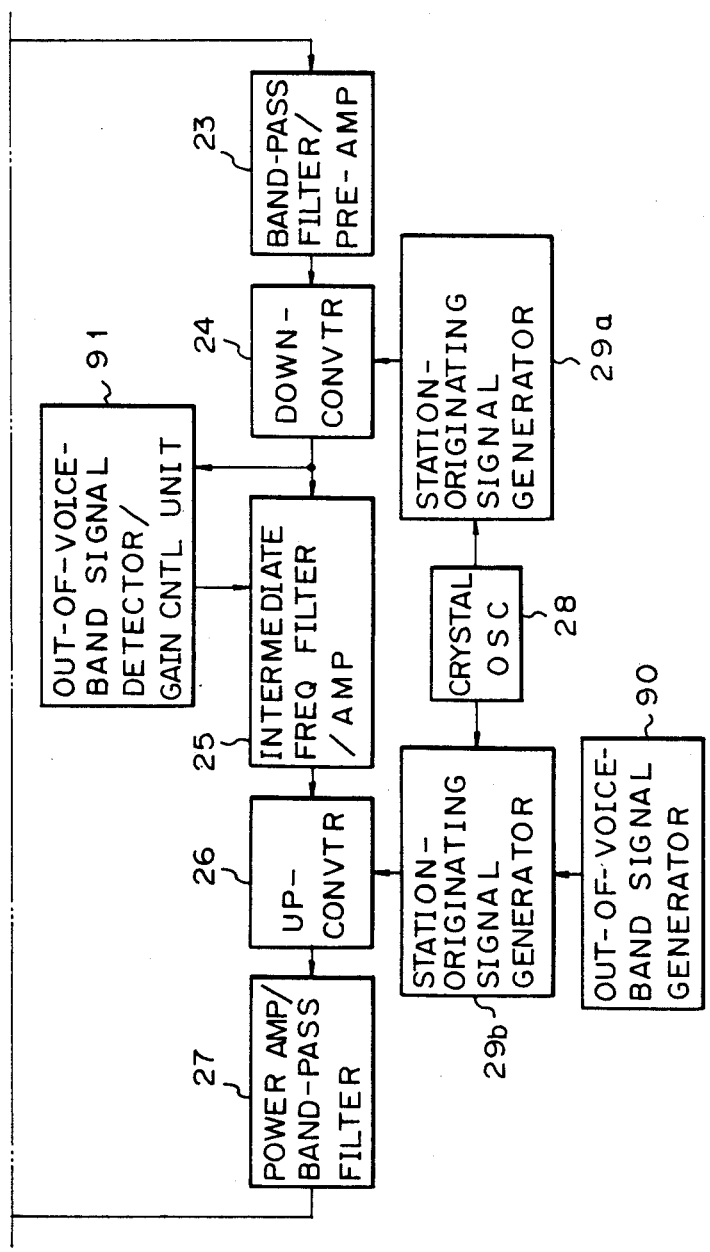

Description of this embodiment has been limited to the one-way booster. The similar effects, however, can be derived from a bi-directional booster as shown in FIG. 10 (FIGS. 10a and 10b contained). Incidentally, in this figure, reference numerals 102 and 103 indicate antenna duplexers.

Moreover, the gain control circuit may be combined with an automatic gain controller (AGC) for controlling the gain, depending upon a magnitude of the received input. Furthermore, the gain can be controlled and an alarm can be issued in order to prevent occurrence of the 'singing' phenomenon.

Figure 11:
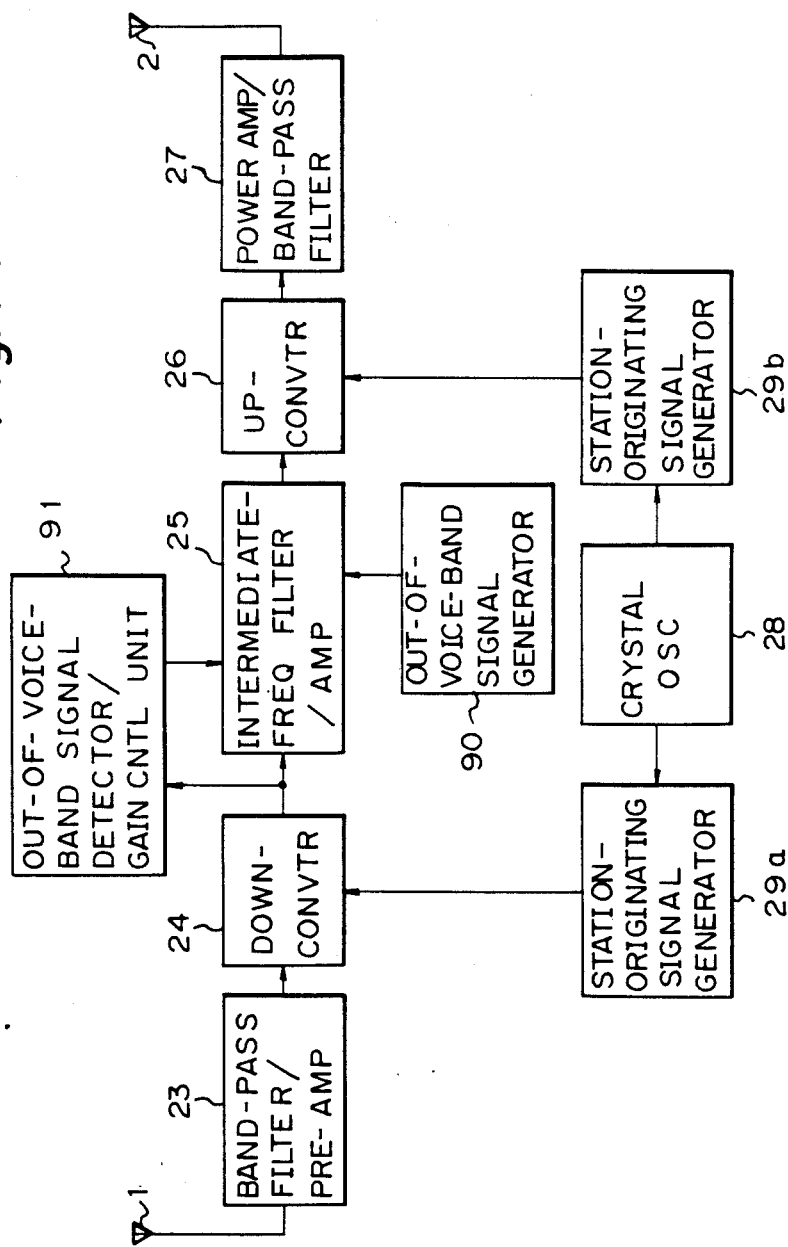

The frequency-modulation, which utilizes the out-of-voice-band signals, can be effected on the station-originating signal generator 29b for the up-converter 26. In addition, the modulation may, as shown in FIG. 11, be performed by employing the intermediate-frequency amplifier 25. The amplitude modulation can also be carried out by the power amplifier 27.

Figure 12:
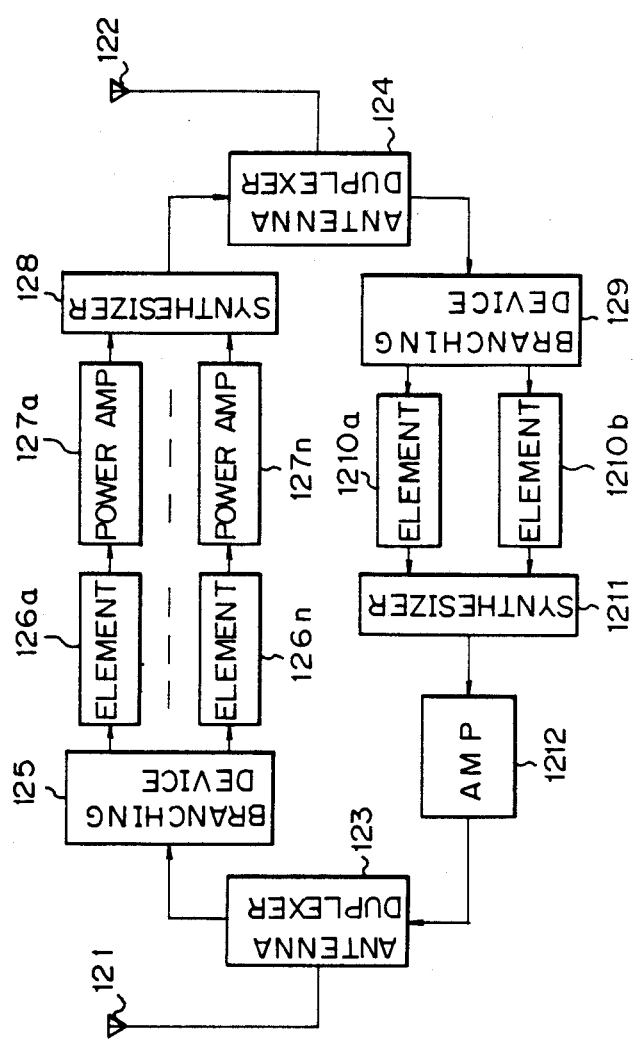
FIG. 12 is a block diagram showing still another HF signal booster embodying the present invention.

Hereinafter, still another embodiment of the present invention will be described with reference to FIG. 12. In this figure, reference number 121 designates a base station antenna which involves the use of a high-gain directional antenna such as a parabolic antenna or the like. Reference numeral 122 denotes a mobile station antenna which involves the use of a non-directional antenna or a low-gain directional antenna. Reference numerals 123 and 124 represent antenna duplexers or branching filters; 125 and n-to-one branching device ("n" is an integer which is larger than one); 126a through 126n elements each having narrow-band selectivity; 127a through 127n narrow-band power amplifiers; 128 an n-to-one synthesizer (or combiner); 129 a one-to-two branching device; 1210a and 1210b elements which respectively have narrow-band and wide-band selectivity; 1211 a two-to-two synthesizer; and 1212 a common amplifier.

The radio waves are received by the base station antenna 121 and the incoming signal is led to the n-to-one branching device 125 through the antenna duplexer 123. At least one element 126a having the narrow-band selectivity (which corresponding to a control channel) and a power amplifier 127a connected in series to the element 126a cooperate to amplify the radio waves of the control channel up to a normal output. The n-to-one synthesizer 128 synthesizes the thus amplified radio waves with the outputs from the elements 126b through 126n for another message channel and from the power amplifiers 127b through 127n. Then the radio waves are radiated through the antenna duplexer 124 and the mobile station antenna 122 into the space.

Figures 1, 2:
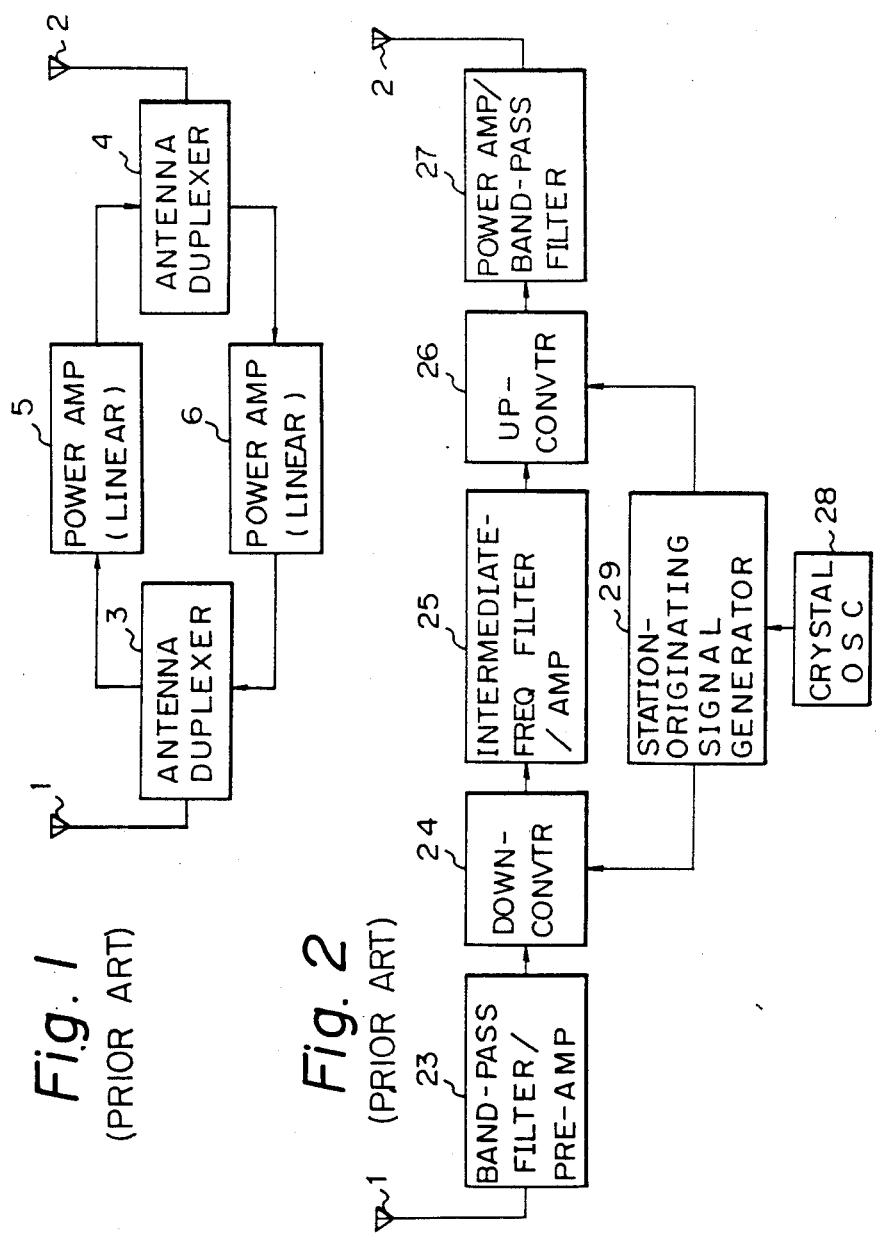
FIG. 1 is a block diagram showing a conventional HF signal booster.
FIG. 2 is a block diagram showing another conventional HF signal booster.
Figure 3:
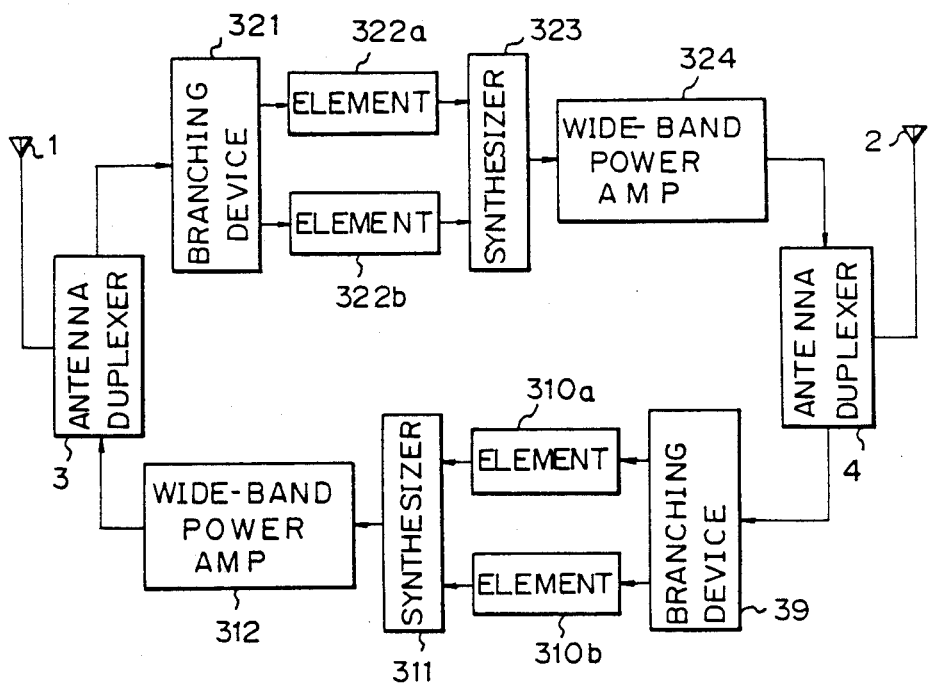
FIG. 3 is a block diagram showing a further conventional HF signal booster.
Figure 4:
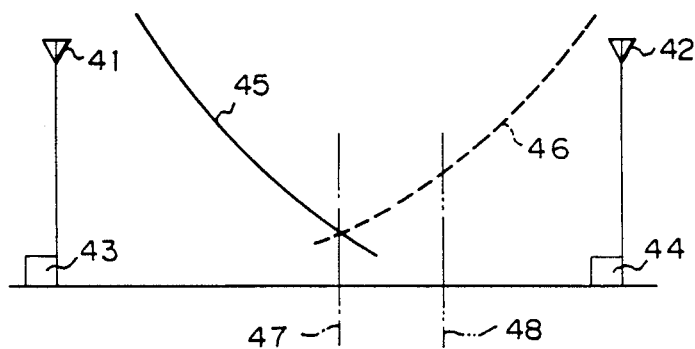
FIG. 4 is an explanatory view of a prior art cellular mobile telephone system.

The radio waves received by the mobile station antenna 122 are amplified while taking a route similar to that shown in FIG. 3. The base station antenna 121 has a high gain, and hence an effective radiation power having high outputs are obtained even in case of employing a small-scale common amplifier 1212.

Figure 13:
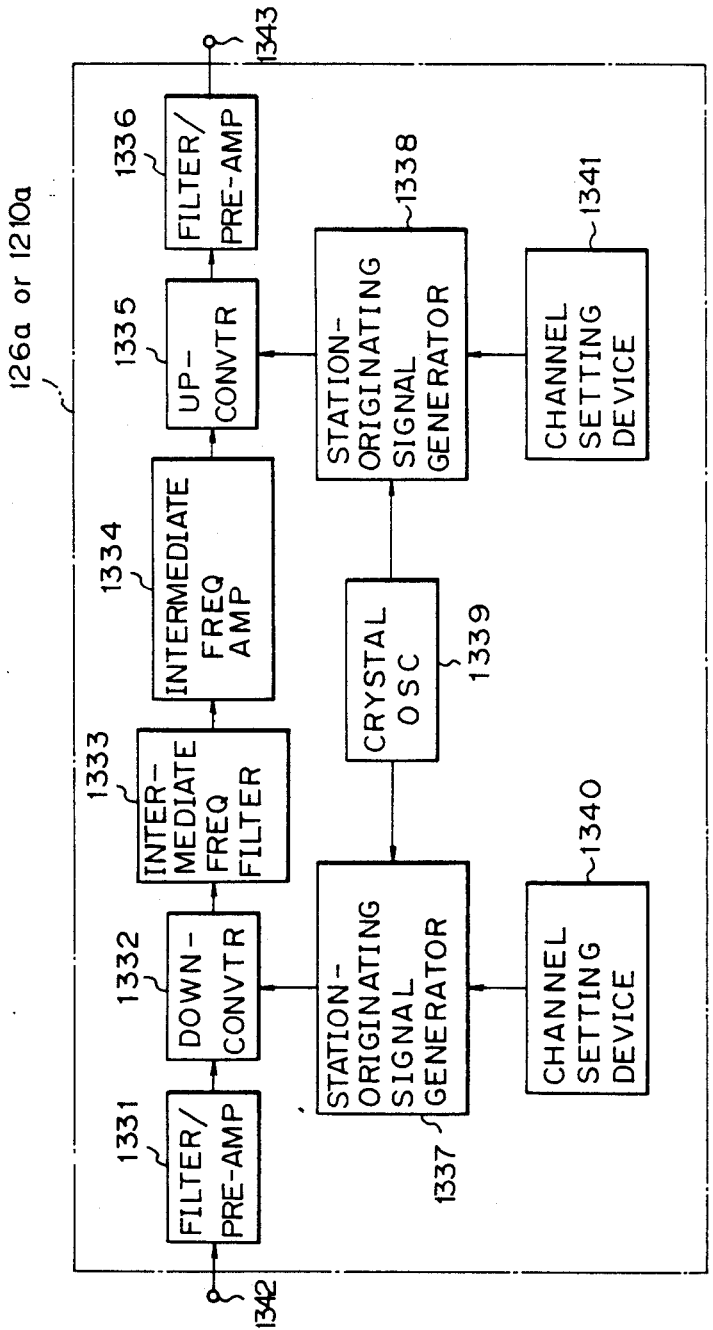
FIG. 13 is a block diagram showing an element having the narrow-band selectivity.

Directing now attention to FIG. 13, there is illustrated a block diagram of an element having the narrow-band selectivity for the control channel used in the present invention. In this figure, reference numeral 131 designates a filter/pre-amplifier; 1332 a down-converter; 1333 an intermediate-frequency filter; 1334 an intermediate-frequency amplifier; 1335 an up-converter; 1336 a filter/pre-amplifier; 1337 and 1338 station-originating signal generators; 1339 a high stable crystal oscillator; and 1340 and 1341 channel setting devices. Input signals to the element having the narrow-band selectivity are selectively amplified by the filter/pre-amplifier 1331 and are then converted into signals having an intermediate-frequency of, for example, 45 MHz by means of the down-converter 1332. Outputs of the down-converter 1332 are selected by the intermediate-frequency filter 1333 and amplified by the amplifier 1334. The outputs are selectively amplified by the filter/pre-amplifier 1336 after being converted by the up-converter 1335. The channel setting devices 1340 and 1341 are separately capable of setting the channels. For instance, assuming that the down-converter 1332 is set to a channel 100 and the up-converter 1335 is set to a channel 102, the station-originating signal generator 1337 produces station-originating signals corresponding to the channel 100, and the radio waves of the channel 100 are converted into the intermediate-frequency signals. Then the radio waves are selectively amplified and applied to the up-converter 1335 in which the station-originating signals generator 1338 produces the station-originating signals corresponding to the channel 102. Therefore, the intermediate-frequency signals are converted into the radio waves corresponding to the channel 102. The highly stable crystal oscillator 1339 supplies a reference frequency common to the station-originating signal generators 1337 and 1338 so that a difference in frequency between the output and input signals to the element can be precisely equivalent to that between a channel and the second channel therefrom.

As a result, the output signals are reradiated at a frequency different from that of the input signal. Hence, the mutual interference between the input signals and the output ones can be prevented, thereby maintaining favourable data transfer. In case that the input signals and the output signals have the same frequency, interference between the input and output signals occurs due to delay produced within the element and another delay caused by a difference between the propagation paths of the direct wave and the reradiated wave. Especially, disadvantageous effects are exerted on the propagation of the digital signals. These unfavorable effects can be eliminated by virtue of the above-mentioned "channel-shifting".

Figure 14:
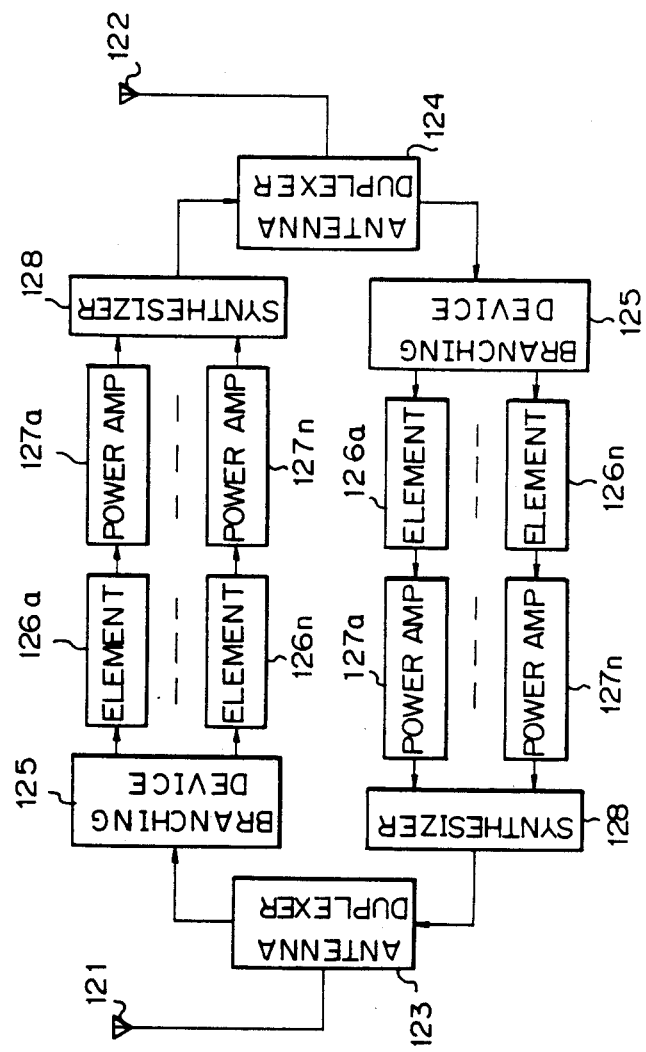
FIG. 14 is a block diagram showing a still further HF signal boost embodying the present invention.
Figure 15:
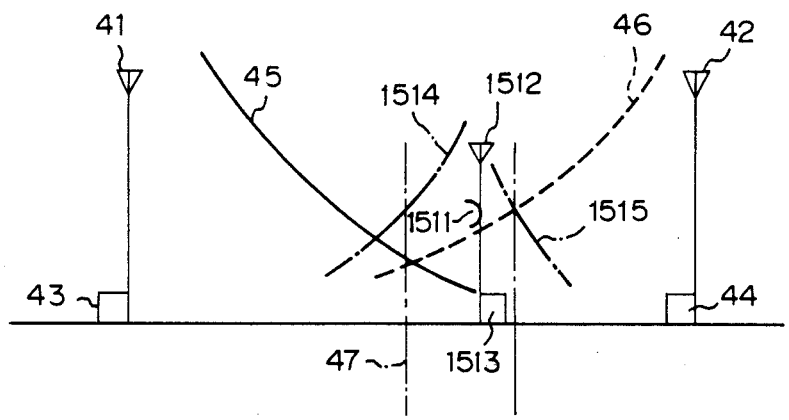
FIG. 15 is an explanatory view of a "bordering system" which is suitable for mobile radio communication, illustrating one embodiment of the present invention.
Figure 16:
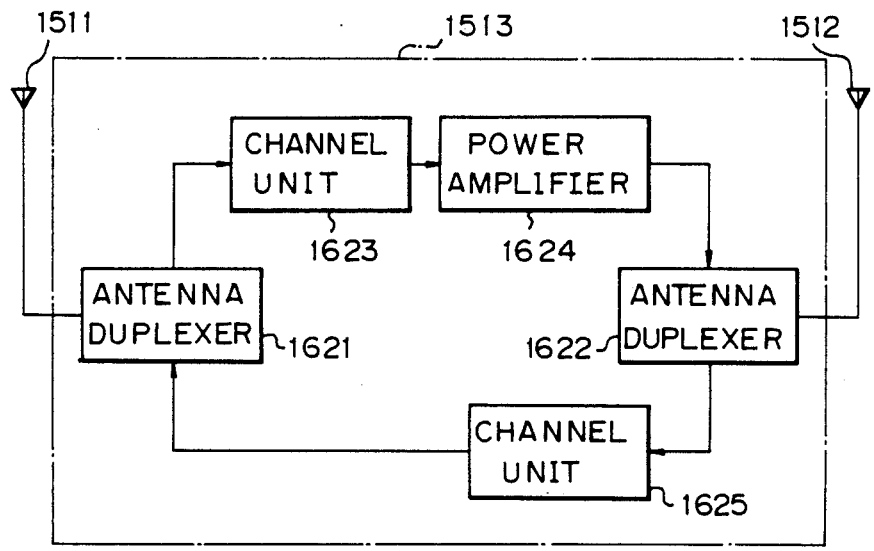
Figure 17:
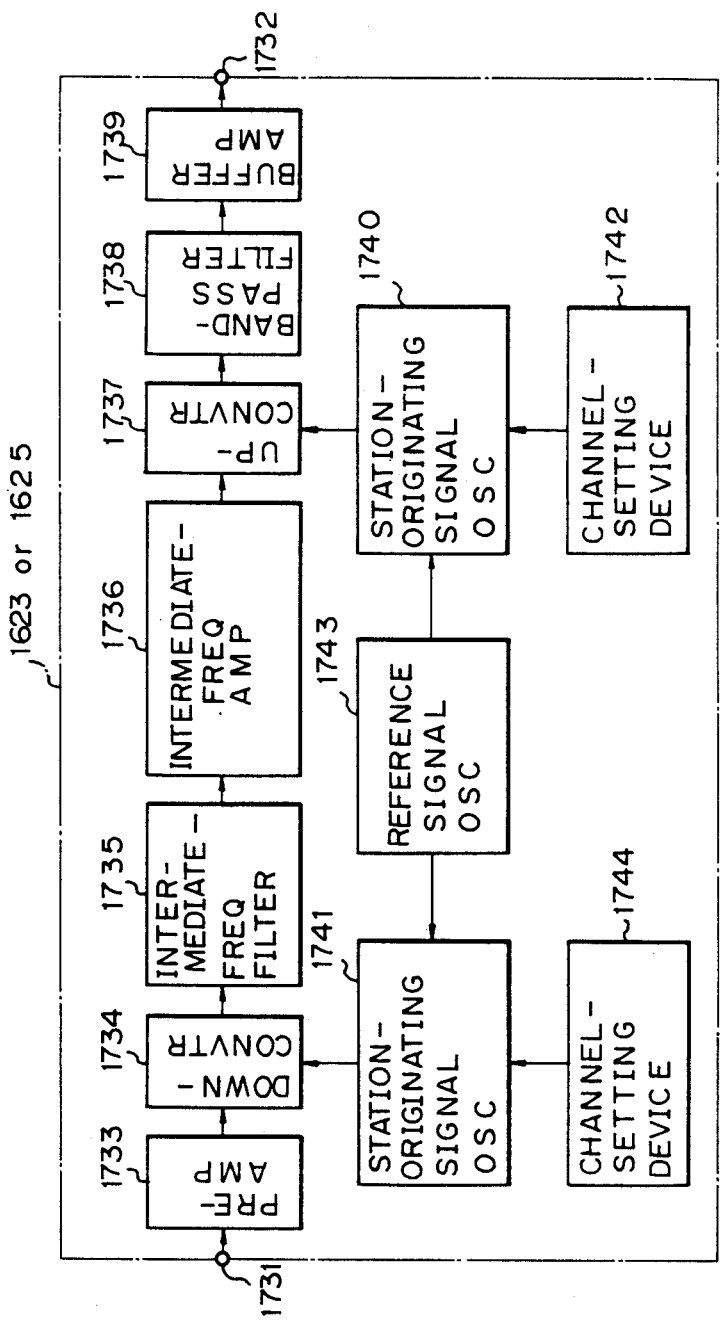

This embodiment has the arrangement in which elements having the selectivity are provided for every channel only in the upstream direction. As shown in FIG. 14, the elements having the selectivity may be provided for every channel both in the upstream direction and in the downstream direction.

The foregoing description has been limited to a specific embodiment of the invention. Additional advantages and modifications will be apparent to those skilled in the art. The invention is, therefore, not limited to the specific details, representative apparatus and illustrative example shown and described in this specification. Rather, it is the object of the appended claims to cover such variations and modifications as come with the true spirit and scope of the invention.

What is claimed is:

1. In a small-cell mobile radio communication system, a high-frequency signal booster for receiving, amplifying and reradiating high-frequency waves, including:
    a first antenna system for receiving first input high-frequency signals from a base station and transmitting first output high-frequency signals to the base station;
    a second antenna system for receiving second input high-frequency signals from a mobile station and transmitting second output high-frequency signals to the mobile station;
    a first channel unit having predetermined first selectivity and connected to said first antenna system for performing selective amplification of the first input high-frequency signals in accordance with the first selectivity;
    a second channel unit having predetermined second selectivity and connected to said second antenna system for performing selective amplification of the second input high-frequency signals in accordance with the second selectivity;
    a first power amplifying means connected to said first channel unit for amplifying output signals of said first channel unit to increase power levels thereof and output the first output high-frequency signal to said first antenna system; and
    a second power amplifying means connected to said second channel unit for amplifying outputs of said second channel unit to increase power levels thereof and output the second output high-frequency signal to said second antenna system;
    wherein at least one of said first and second channel units includes a down-converter for converting all or part of said first or second input signal into an intermediate-frequency signal and an up-converter for converting said intermediate-frequency signal into the output signal of said one of the first and second channels units.

2. A high-frequency signal booster as set forth in claim 1, wherein a separate station-originating signal oscillator is connected to each of said up-converter and down-converter.

3. A high-frequency signal booster as set forth in claim 2, wherein at least said station-originating signal oscillator connected to said up-converter includes a modulating circuit.

4. In a small-cell mobile radio communication system, a high-frequency signal booster for receiving, amplifying and reradiating high-frequency waves, including:
    a first antenna system for receiving first input high-frequency signals from a base station and transmitting first output high-frequency signals to the base station;
    a second antenna system for receiving second input high-frequency signals from a mobile station and transmitting second output high-frequency signals to the mobile station;
    branching means connected to said first and second antenna systems for supplying said first or second input high-frequency signal to two or more output portions thereof;
    two or more channel units, each of which is connected to a different one of the output portions of said branching means and having predetermined selectivity for performing selective amplification of the first or second input high-frequency signal, wherein at least one channel unit includes a down-converter for converting all or part of the first or second input high-frequency signal into an intermediate-frequency signal and an up-converter for converting said intermediate-frequency signal into the output signal of said one channel unit;
    combining means connected to said channel units for combining output signals of said channel units; and
    a common power amplifying means connected to said combining means for amplifying outputs of said combining means to increase power levels thereof and output the first or second output high-frequency signal to said first or second antenna system.

5. A high-frequency signal booster as set forth in claim 4, wherein at least said one channel unit performs the function of selectively amplifying all or part of the first or second input signal in accordance with the predetermined selectivity.

6. A high-frequency signal booster as set forth in claim 4, including a station-originating signal oscillator connected to each of said up-converter and down-converter.

7. A high-frequency signal booster as set forth in claim 6, wherein said station-originating signal oscillator connected to at least said one up-converter includes a modulating circuit.

8. In a small-cell mobile radio communication system, a high-frequency signal booster for receiving, amplifying and reradiating high-frequency signals at the same frequency as that of the received signal, including:
    a receiving antenna for receiving input high-frequency signals;
    a transmitting antenna for transmitting output high-frequency signals;
    a down-converter connected to said receiving antenna for converting the received input signals into intermediate-frequency signals;
    an up-converter, which being connected to said down-converter and said transmitting antenna, for converting the intermediate-frequency signals into the output high-frequency signals to be transmitted from said transmitting antenna;
    first station-originating signal generators connected to said down-converter for generating first station-originating signals to be inputted to said down-converters; and second station-originating signal generators connected to said up-converter for generating second station-originating signals to be inputted to said up-converter, wherein the output high-frequency signals are frequency-modulated with out-of-voice-band signals before transmitted from the transmitting antenna, and wherein the out-of-voice-band signals are detected from the received input signals and further a gain of said high-frequency signal booster is controlled in accordance with the detected level of the out-of-voice-band signals.

9. A high-frequency signal booster as set forth in claim 8, wherein the second station-originating signals produced in said second station-originating signal generator are directly frequency-modulated with the out-of-voice-band signals in order to effect the modulation of the output high-frequency signals.

10. A high-frequency signal booster as set forth in claim 8, wherein the intermediate-frequency signals are amplified and further examined to detect the out-of-voice-band signals in the received input high-frequency signals.

11. In a small-cell mobile radio communication system, a high-frequency signal booster for receiving, amplifying and reradiating high-frequency waves at the same frequency as that of the signals received from a base station and a mobile station, said booster having:

an upstream antenna for receiving first input signals sent from a base station and transmitting first output signals to the base station;

an upstream antenna duplexer connected to said upstream antenna for accepting the receiving first input signals from said upstream antenna and sending the first output signals to said upstream antenna;

upstream branching means connected to said upstream antenna duplexer for accepting the first input signals and supplying the first input signals to output portions thereof;

upstream elements, each having a predetermined selectivity and connected to a different one of said output portions of said upstream branching means for selectively amplifying the first input signals accepted from said upstream branching means in accordance with the predetermined selectivity;

upstream combining means connected to said upstream elements for combining the amplified first input signals with first synthetic signals;

an upstream common amplifier connected to said upstream combining means for amplifying the first synthetic signals to produce the first output signals;

a downstream antenna for receiving second input signals sent from a base station and transmitting second output signals to the base station;

a downstream antenna duplexer connected to said downstream antenna for accepting the received second input signals from said downstream antenna and sending the second output signals to said downstream antenna;

downstream branching means connected to said downstream antenna duplexer for accepting the second input signals and supplying the second input signals to output portions thereof;

downstream elements, each having a predetermined selectivity and connected to a different one of said output portions of said downstream branching means for selectively amplifying the second input signals accepted from said downstream branching means in accordance with the predetermined selectivity;

downstream combining means connected to said downstream elements for combining the amplified second input signals with second synthetic signals; and a downstream common amplifier connected to said downstream channel selecting means for amplifying the second synthetic signals to produce the second output signals, wherein said base station antenna is a high-gain directional antenna;

said high-frequency signal booster further including:

first additional elements having predetermined narrow-band selectivity for every channel for use in operation in the upstream direction in which the radio signals transmitted from said base station are amplified and reradiated;

first relatively-narrow-band power amplifiers, each of which is connected in series to a different one of said first additional elements for further amplifying the output of said first additional elements;

second additional elements, at least one of which has narrow-band selectivity for one channel for use in operation in the downstream direction in which the radio waves transmitted from said mobile station are amplified and reradiated;

a second common power amplifier connected in series to said one of the second additional elements having narrow-band selectivity for amplifying the output of said second additional element.

12. A high-frequency signal booster as set forth in claim 11, wherein each of said first additional power amplifiers is composed of a class B or C relatively-narrow-band power amplifier, while said second common power amplifier is composed of a class A wide-band power amplifier.

13. A high-frequency booster as set forth in claim 11, wherein said one of the second additional elements has relatively-narrow-band selectivity, which is designed for a control channel, and another one of said second additional elements having wide-band selectivity, which is designed for a message channel, are provided for use in the operation in the downstream direction.

14. A high-frequency booster as set forth in claim 12, wherein said one of the second additional elements has relatively-narrow-band selectivity, which is designed for a control channel, and another one of said second additional elements having wide-band selectivity, which is designed for a message channel, are provided for use in the operation in the downstream direction.

15. A high-frequency booster as set forth in claim 11, 12, 13 or 14 wherein said first and second additional elements each of which having the relatively-narrow-band selectivity and being used as control channels in operations in the upstream and downstream directions, are so arranged that receiving and transmitting channels are shifted by at least one channel.

16. A high-frequency signal booster as set forth in claims 11, 12, 13 or 14, wherein the output high-frequency signals are frequency-modulated with out-of-voice-band signals before transmitted from the transmitting antenna, and wherein the out-of-voice-band signals are detected from the received inputted signals and further a gain of said high-frequency signal booster is controlled in accordance with the detected level of the out-of-voice-band signals.

17. A bordering system as set forth in claim 16, wherein said means for shifting frequencies of said received control signals at the given intervals includes a down-converter for temporarily converting said received control signals into intermediate-frequency signals, a band-pass filter connected to said down-converter for accepting the intermediate-frequency signals and passing only the control signals therethrough and an up-converter connected to said band-pass filter for accepting the control signal from said band-pass filter and re-converting the control signals into high-frequency signals.

18. A bordering system as set forth in claim 16, characterized in that said bordering system is disposed in the vicinity of a border between service areas of two adjacent base stations.

19. A bordering system as set forth in claim 16, wherein the base station is equipped with a high-gain antenna, of which a beam angle is relatively small, such as a paraboilic antenna, while said mobile station is equipped with a direction antenna of which a beam angle is relatively large.

* * * * *